(12) United States Patent
Keates (10) Patent No.: US 10,119,666 B2
(45) Date of Patent: Nov. 6, 2018

(54) DISPLAY BACKLIGHTING USING AMBIENT LIGHT

(71) Applicant: Intel Corporation, Santa Clara, CA (US)

(72) Inventor: Andrew Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 15/146,160

(22) Filed: May 4, 2016

(65) Prior Publication Data

US 2017/0321856 A1    Nov. 9, 2017

(51) Int. Cl.

| | |
|---|---|
| *F21S 11/00* | (2006.01) |
| *G02B 27/42* | (2006.01) |
| *G02B 26/08* | (2006.01) |
| *F21V 7/00* | (2006.01) |
| *F21V 7/06* | (2006.01) |
| *F21V 14/04* | (2006.01) |
| *G02B 19/00* | (2006.01) |

(52) U.S. Cl.
CPC ............ *F21S 11/002* (2013.01); *F21V 7/0033* (2013.01); *F21V 7/06* (2013.01); *F21V 14/04* (2013.01); *G02B 19/0019* (2013.01); *G02B 19/0038* (2013.01); *G02B 26/0833* (2013.01); *G02B 27/425* (2013.01)

(58) Field of Classification Search
CPC . F21S 11/002; G02B 27/425; G02B 26/0833; G02B 19/0038; G02B 19/0019; F21V 7/0033; F21V 7/06; F21V 14/04
See application file for complete search history.

(56) References Cited

U.S. PATENT DOCUMENTS

| | | | | |
|---|---|---|---|---|
| 4,997,263 | A * | 3/1991 | Cohen ................. | G02B 27/017 345/102 |
| 9,213,182 | B2 * | 12/2015 | Shi ........................... | B81B 3/00 |
| 9,645,501 | B2 * | 5/2017 | Patra .................... | G02B 27/0927 |
| 9,746,093 | B2 * | 8/2017 | Peret .................... | G06K 9/2027 |
| 2014/0184573 | A1 * | 7/2014 | Nemchuk .......... | G02B 26/0833 345/204 |
| 2016/0327751 | A1 * | 11/2016 | Wu .................... | G02B 6/29344 |

* cited by examiner

Primary Examiner — Charles Hicks
(74) Attorney, Agent, or Firm — International IP Law Group, P.L.L.C.

(57) ABSTRACT

An example optical device for backlighting includes a receiver disposed in a mobile device to receive ambient light. The optical device also includes a concentrator to concentrate the received ambient light received through the receiver. The optical device further includes a channeler to direct the ambient light beneath a surface of the mobile device to a digital display of the mobile device.

18 Claims, 9 Drawing Sheets

DISPLAY BACKLIGHTING USING AMBIENT LIGHT

BACKGROUND ART

Mobile devices may use electrical illumination to make high-resolution displays visible. For example, liquid-crystal displays (LCDs) that use light-modulating properties of liquid crystals to display images may use backlights as liquid crystals do not emit light directly.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

As discussed above, some displays such as LCDs use backlights to display images. For example, a set of backlights may be disposed behind an LCD panel and powered when the device is turned on. However, in bright situations such as direct sunlight, the ambient light in an environment may be brighter than the light produced by the backlights and filtered through the LCD. Thus, viewing a mobile device such as a smartphone may be difficult in full sunlight or similar conditions. For example, the pupils of a person standing in bright sunlight may be constricted due to the brightness of the sunlight and the display may appear dark and therefore difficult to see. Moreover, backlights may also consume a significant amount of battery power. Thus, increasing the brightness of backlights in LCDs may significantly reduce battery life.

The present disclosure relates generally to techniques for backlighting a display using ambient light. Specifically, the techniques described herein include an apparatus, method and system for collecting ambient light, concentrating the ambient light, and channeling the concentrated light to a light guide to illuminate a display. In some examples, the concentrated light can be combined with electronic backlighting to increase the brightness of the display. Alternatively, in some examples, electronic backlighting can be turned off such that the concentrated light is instead used to provide brightness to the display. The techniques described herein enable brighter displays using less power in bright environments. In addition, the techniques enable power to be saved in mobile devices by using an ambient light source rather than electronic backlighting. Furthermore, the light may be concentrated into a thin beam that can be captured in a film or within the thickness of a display glass without increasing depth in the mobile device.

Figure 1:
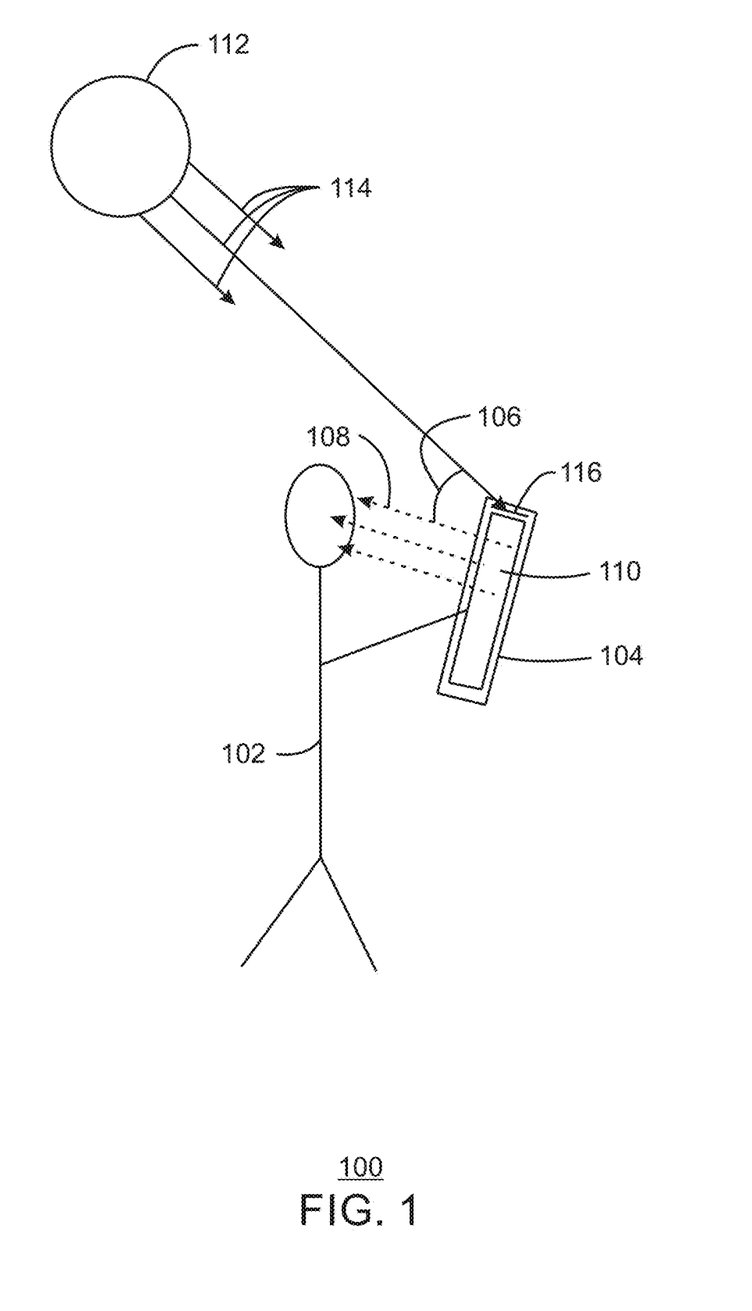
FIG. 1 is a diagram illustrating an example operating environment for a display backlight using ambient light.

FIG. 1 is a diagram illustrating an example environment for a display backlight using ambient light. The example environment is referred to generally by the reference number 100.

The example environment 100 includes a user 102 holding an example mobile device 104. For example, the mobile device may be the mobile device 700 described in FIG. 7 below. The mobile device 104 is shown held at a reflex angle 106 with respect to the incoming light 114. A reflex angle, as used herein, refers to an angle of the incoming light relative to the mobile device 104 that may cause mirrors in the mobile device 104 to reflect the incoming light through the mobile device 104 in the manner depicted in FIGS. 2-6 below. The mobile device 104 may exhibit a "reflex action" when the reflex angle is detected. For example, the mobile device 104 may exhibit increased brightness at a display 110. The mobile device 104 is shown displaying an image 108 from a display 110 of the mobile device 104. The environment 100 also includes a light source 112 shown projecting light 114 towards the mobile device 104. The mobile device 104 also includes a receiver 116 receiving some of the light 114 from the light source 112.

In the example environment 100, the user 102 may be viewing the mobile device 104 outside where a bright light source exists. For example, the light source 112 may be sunlight. The light 114 from the light source 112 can be collected via the receiver 116 in the mobile device 104. In some examples, the receiver 116 may be located in a surface of the mobile device 104. For example, the receiver 116 may be a 2 centimeter-wide transparent portion of a front bezel of the mobile device 104 through which light may travel. In some examples, about 10% of the frontal area of a mobile device could be used to capture light. For example, on a bright day, in shade, the incoming light intensity of 20,000 Nits compares to a 120 Nit brightness commonly used when benchmarking electronic display brightness. If the capture area is 10% of the display area, the energy ratio may be 1,000 Nits captured to 120 Nits displayed. For example, 10% of 20,000 is 2,000 Nits, but due to losses and the effects of soft focus, 1,000 Nits may be effectively captured. Although the examples shown herein feature precise angles, one or both of the parabolic mirrors may be manufactured for "soft focus" such that the reflex angle can be made less sharp. A wider capture angle may then be possible, however the intensity of the collected light may thus be diminished. Moreover, displays are not 100% efficient and the full backlight intensity may not delivered to the display. Therefore, if 12% of the captured light makes it back up to the display, this would double the brightness of the display. In bright sunlight, where screen readability is a bigger problem, more light could be delivered to the back of the screen. The mobile device 104 can then use the collected light to increase the brightness of the display 110 of the mobile device 104 as described further below. Thus, the display 110 may be easier to view outside with the corresponding increase in brightness.

In some examples, the mobile device 104 may include a device capable of detecting the angle at which the mobile device 104 is being held. For example, the mobile device 104 may include a gyroscope or accelerometer. In some examples, the collection of light 114 may be performed in response to the detection of a reflex angle 106. For example, if an angle between the mobile device 104 and a vertical axis 107 is detected within a threshold range of a predetermined reflex angle 106, then the mobile device 110 may begin collecting the light 114. In some examples, a plurality of adjustable microelectromechanical system (MEMS) mirrors may be disposed at the receiver to create a reflex angle. For example, the MEMs mirrors may adjust based on the incident angle of incoming ambient light to form a reflex angle between the MEMS mirrors and the direction of the ambient light. In some examples, the mobile device 104 may otherwise use electronic backlighting for the display 110. In some examples, the electronic backlighting may be combined with the collected light 114 to increase the brightness of the images 108. For example, the collected light 114 can be sent to a film between the backlight and the LCD to improve the LCD lighting. Thus, the mobile device 104 may use the light 114, combined with concentration of the light, to generate images 108. In some examples, the electronic backlighting may be turned off in response to detecting the reflex angle 106. The concentrated light may therefore be bright enough to use the display without any electronic backlighting. Thus, battery power may be saved by turning off electronic backlighting. Furthermore, the display 110 may be brighter using the concentrated light than the maximum brightness level of the electronic backlighting. Thus, images 110 may be visible regardless of the level of brightness of the light source 112.

The diagram of FIG. 1 is not intended to indicate that the example environment 100 is to include all of the components shown in FIG. 1. Rather, the example environment 100 may have fewer or additional components not illustrated in FIG. 1 (e.g., additional light sources, angles, etc.).

Figure 2:
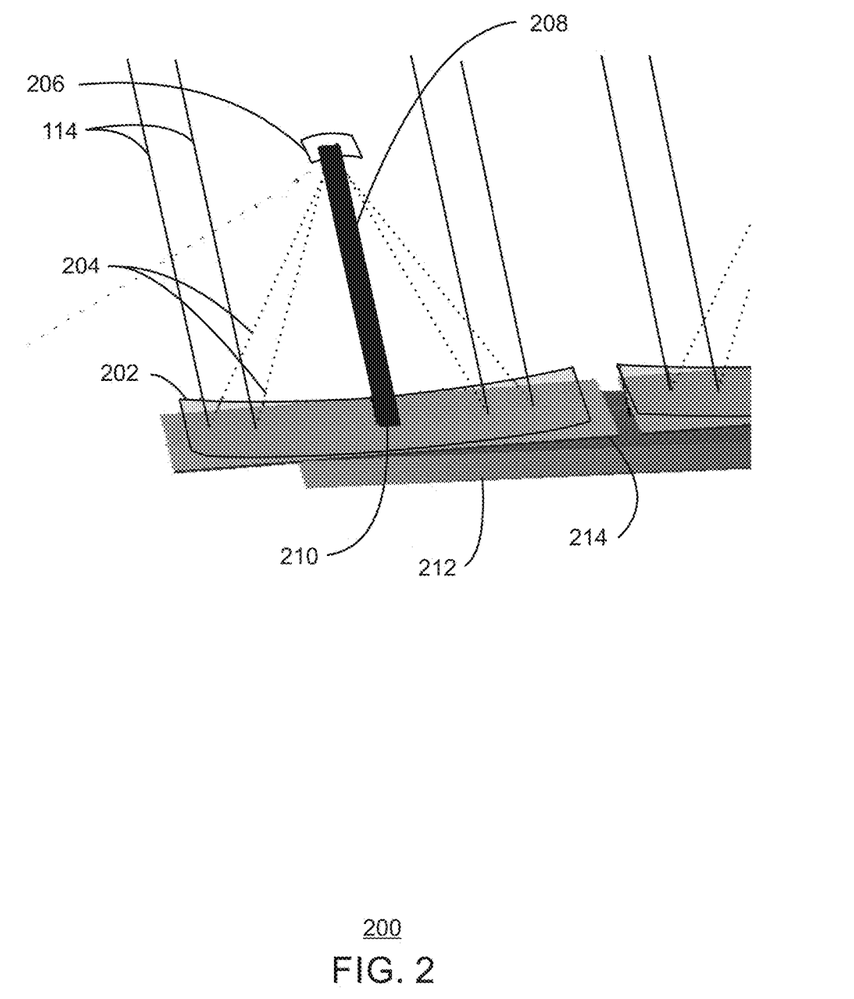
FIG. 2 is a close-up cross section diagram illustrating an example pair of parabolic mirrors for collecting ambient light.

FIG. 2 is a close-up cross section diagram illustrating an example apparatus with a pair of parabolic mirrors for collecting ambient light. The example apparatus is referred to generally by the reference number 200 and can be implemented using the mobile device 700 of FIG. 7 below. In some examples, the example apparatus 200 can be implemented in the mobile device 104 FIG. 1 above.

The example apparatus 200 is shown receiving light 114 from a light source. The apparatus 200 includes a first parabolic mirror 202 to reflect the light 114 as shown by 204 towards a second parabolic mirror 206. For example, the first parabolic mirror 202 may be located under a display glass (not shown) and the second parabolic mirror 206 may be located on the top side of the display glass. In some examples, the second parabolic mirror 206 can be placed above a focus (not shown) of the first parabolic mirror 202. In some examples, the second parabolic mirror 206 may have a focal length equal to the distance between the first parabolic mirror 202 and the second parabolic mirror 206. A concentrated beam of light 208 is shown projecting from the second parabolic mirror 206. The first parabolic mirror 202 also includes a slot 210. The apparatus 200 further includes a first surface 212 and a second surface 214 upon which the parabolic mirror 202 is disposed.

In FIG. 2, light 114 is received from any suitable light source and concentrated via mirrors 202 and 206 to form concentrated light 208. In some examples, the second parabolic mirror 206 may be narrow and thus block a small fraction of the incoming light 114. The concentrated light 208 may pass through a slot 210 in the first parabolic mirror 202. In some examples, the concentrated light 208 may be channeled towards a display via a channeling apparatus between the first surface 212 and the second surface 214. For example, the concentrated light can be a parallel beam of light returning from the second parabolic mirror 206. In some examples, the concentrated light 208 can be collected via reflections in the area behind the second surface 214 and the first surface 212. For example, a simple flat diffraction film may be a cost-effective and simply way to channel the light out to a light guide. In some examples, such as the bezel of a cell phone, the light may travel across strips of the order of 1 centimeter wide. Additional example apparatuses for channeling the concentrated light are discussed in greater detail with respect to FIGS. 3 and 4 below.

The diagram of FIG. 2 is not intended to indicate that the example apparatus 200 is to include all of the components shown in FIG. 2. Rather, the example apparatus 200 can be implemented using fewer or additional components not illustrated in FIG. 2 (e.g., additional mirrors, light sources, slots, etc.).

Figure 3:
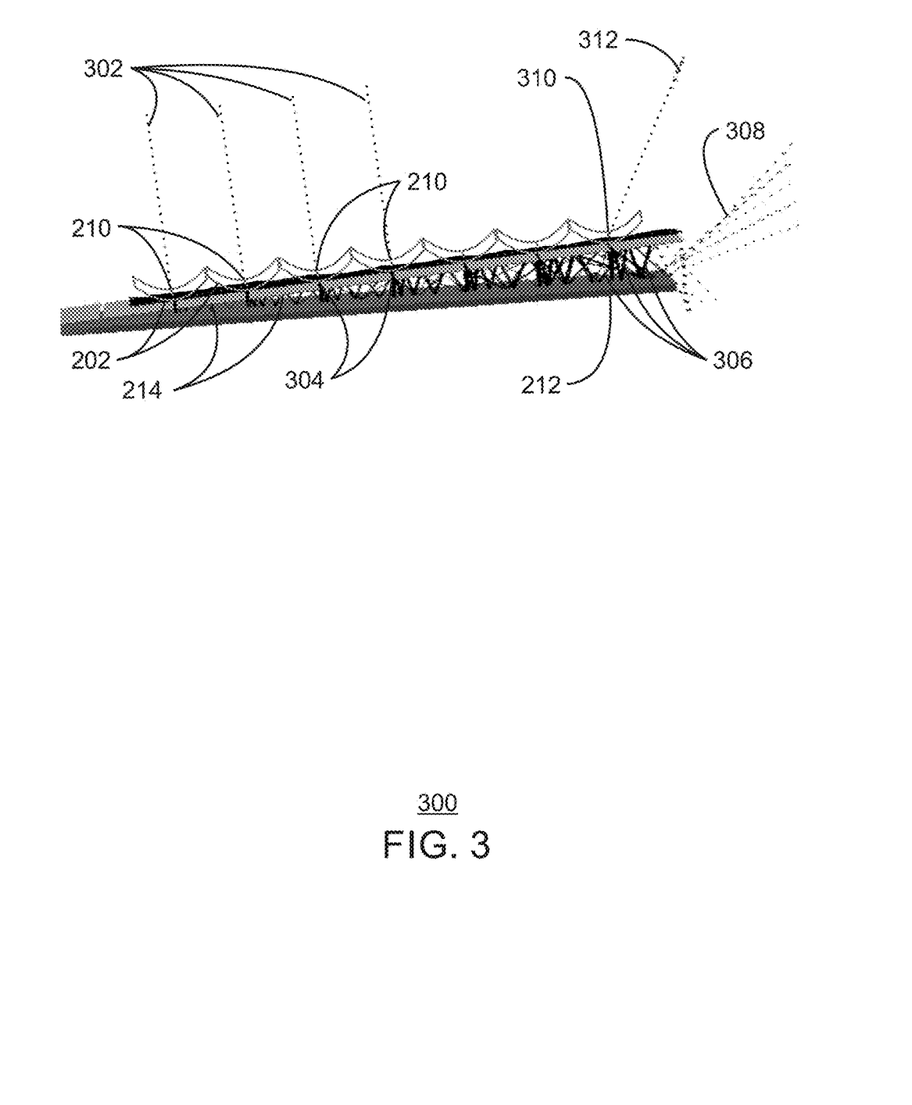
FIG. 3 is a block diagram of an example channeling apparatus with center tapping and a tilted mirror.
Figure 7:
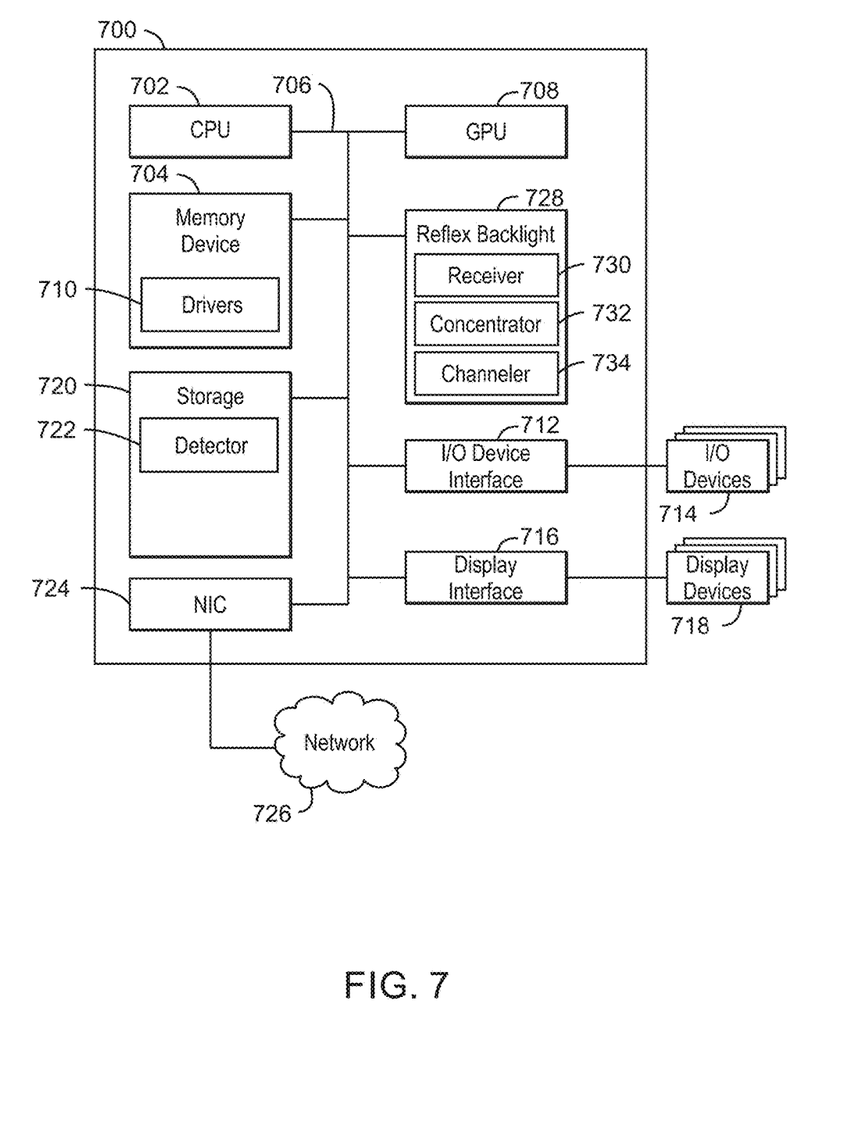
FIG. 7 is a block diagram illustrating an example mobile device that can use ambient light for backlighting.

FIG. 3 is a block diagram of an example channeling apparatus with center tapping and a tilted mirror. The example channeling apparatus is generally referred to by the reference number 300 and can be implemented in the reflex backlight 728 of the mobile device 700 below.

The channeling apparatus 300 includes concentrated light 302 that is passed through a plurality of slots 210 in the middle of a plurality of mirrors 202 attached to surfaces 214. The surface 214 also has slots 304 aligned with the slots 210 of the plurality of mirrors. A plurality of reflections 306 are shown between surfaces 212 and 214. A plurality of reflections 308 are shown output to the right.

As shown in FIG. 3, a channeling apparatus with center tapping can have parallel beams transmitted through slots 210 in the center of the primary parabolic mirrors 202. In this example, there are no gaps between adjacent primary parabolic mirrors 202. In FIG. 3, concentrated light 302 is shown shining parallel light through slots 210. In some examples, the slots 304 in the surface 214 align with the slots 210 in the center of the parabolic mirrors 202.

As can be seen in the diagram, the angled back mirror of surface 214 causes the rays to be reflected to the right side of their entry slots 304 and captured as they are reflected further to the right of the channeling apparatus 300. A few rays such as ray 312 reflect back out of other slots 310, but the majority of light rays continue reflecting at an increasingly shallow angle. In some examples, after many reflections, the critical angle may have been reached with respect to the normal to the surface and they will also reflect off the underside of the glass surface which is the slot in the parabolic mirror. A critical angle, as used herein, refers to an angle of incidence above which total internal reflection occurs. The light 312 lost back through the slot 310 may be minimized by making the slots 304 narrow. In some examples, this can be achieved by using narrower second parabolic mirrors (not shown) close to the focus of the first parabolic mirrors 202. Alternatively, or in addition, the optics of the secondary mirrors can be adjusted such that the narrowest state of each beam is exactly where the slots are to make the beams very narrow as the beams enter the slots. A focal point may be where all the rays converge to a point if the incoming light had been parallel beams. In this example, the incoming light is not parallel beams coming from the initial mirror. Each secondary mirror can convert the beams back to a narrow parallel beam, but with adjustments that focus that beam reflected from the second mirror to be very narrow as the beam goes through the slot. In some examples, the more reflections the light encounters after passing through the slots, the shallower each reflection's angle may become. In some examples, the two surfaces 212, 214 can be close to one another to maximize reflections, but far enough apart that the first reflection can still reflect the beam coming through the slot 210 in the first mirror 214 to one side of that mirror 214. In this solution, the backside reflection area consists of two wedged mirrors, which causes each ray 306 to reflect at a shallower angle each time it is reflected until it either exits a beam entry slot 310, or, as most rays do, exists to the right of the area, which is effectively a planar light guide. In some examples, the number of reflections may be balanced with the angle between the sandwich halves. For example, more reflections may be produced the closer that the upper and lower mirrors are together. A more oblique angle may result in fewer reflections, but may bring the sides farther apart to the right of the diagram, so that fewer reflections happen due to the deeper depth travelled by each reflection. Also, a more oblique angle may result in a thicker profile. In any case, most of the reflections may be output to the right towards a light guide as shown at 308.

The diagram of FIG. 3 is not intended to indicate that the example channeling apparatus is to include all of the components shown in FIG. 3. Rather, the example channeling apparatus may include fewer or additional components not illustrated in FIG. 3 (e.g., additional mirrors, light sources, slots, reflections, etc.).

Figure 4:
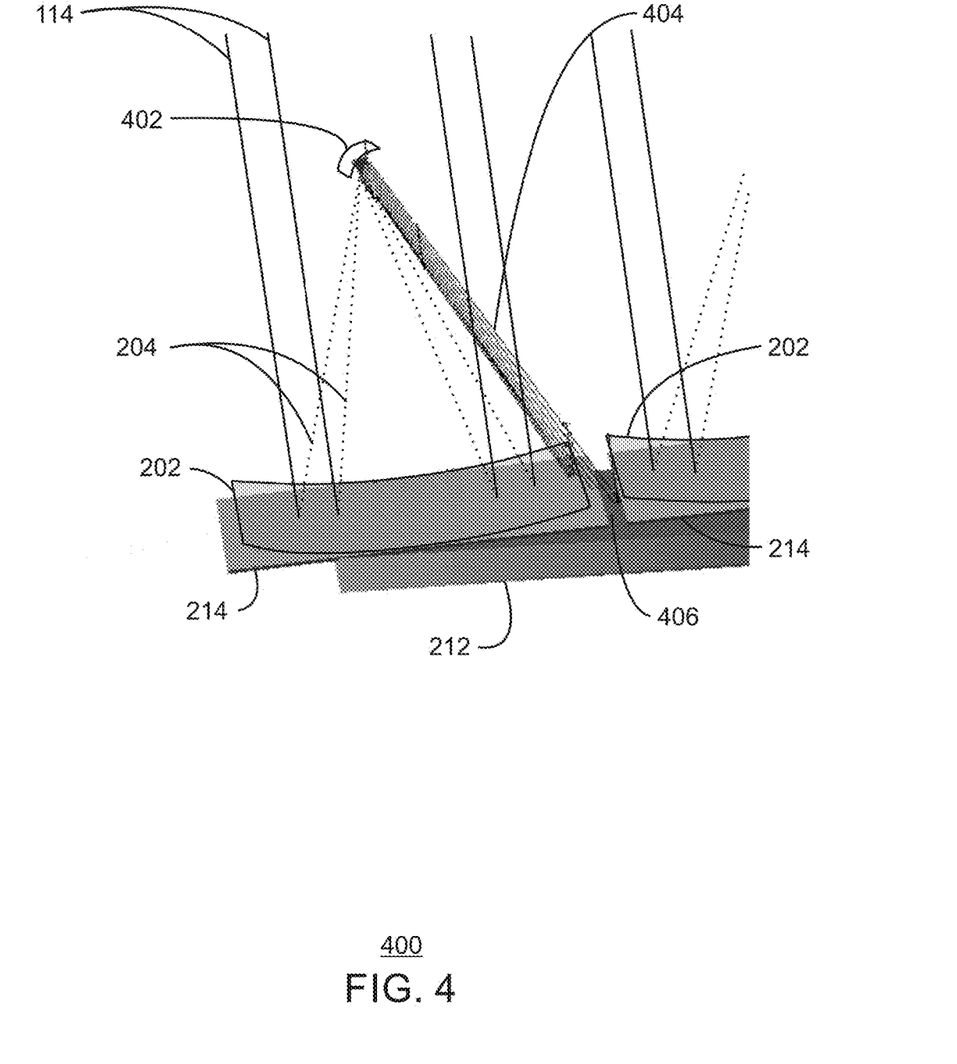
FIG. 4 is a close-up cross section diagram illustrating an example channeling apparatus with a side exit of collected light.

FIG. 4 is a close-up cross section diagram illustrating an example channeling apparatus with a side exit of collected light. The example channeling apparatus is generally referred to by the reference number 400. For example, the channeling apparatus can be implemented in the reflex backlight 728 of the mobile device 700 below.

The example channeling apparatus 400 includes an angled second parabolic mirror 402 to reflect concentrated light 404 received from the first parabolic mirror 202 through an opening 406 between first parabolic mirrors 202 and surface 214.

In the example channeling apparatus 400, rotating the second parabolic mirror 402 about a focus can direct the parallel beam 404 to one side and cause the parallel beam 404 to enter the reflective lower space below the mirror 214 at an angle which produces an improved starting angle for reflection of the rays to the right of the reflective area behind the first parabolic mirrors 202. In some examples, the reflections may thus reach the critical angle with fewer reflections. FIG. 4 depicts this phenomenon in a simple ray diagram with a mirror pair 202, 402 and two adjacent mirrors 202 with the second parabolic mirror 402 directing the parallel beam 404 between the first parabolic mirrors 202. As discussed above, the channeling apparatus 400 can be improved by making the second parabolic mirrors 402 narrow and the beam of light narrow. Once reflected under the primary mirrors 202 into the lower reflecting area, the beams may once again exit to the right as in FIG. 3 above. However, in FIG. 4, the light beams may exit with fewer losses as the critical angle may be reached after fewer reflections due to the initial angle of incidence of the concentrated light beam on the back face of the surface 214 in the lower reflection light collection area.

The diagram of FIG. 4 is not intended to indicate that the example channeling apparatus is to include all of the components shown in FIG. 4. Rather, the example channeling apparatus can be processed using fewer or additional components to produce effects not illustrated in FIG. 4 (e.g., additional mirrors, light sources, slots, reflections, etc.).

Figure 5:
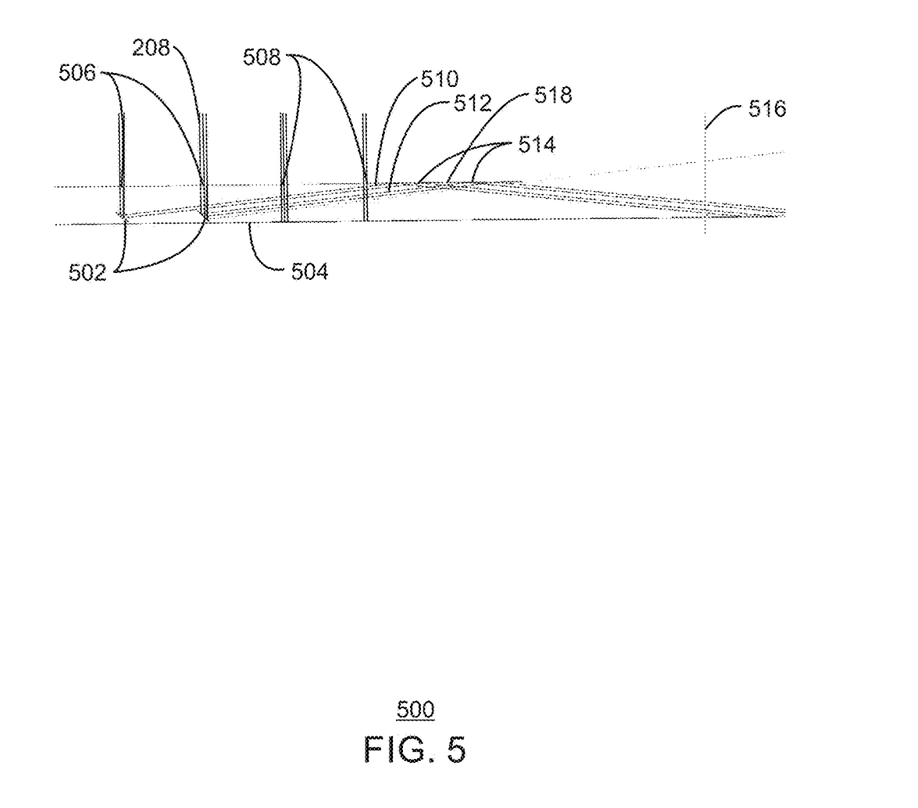
FIG. 5 is a cross section diagram illustrating an example apparatus that can channel collected light via a set of angled mirrors.

FIG. 5 is a cross section diagram illustrating an example channeling apparatus that can channel collected light via a set of angled mirrors. The example channeling apparatus is generally referred to by the reference number 500 and can be implemented in the reflex backlight 728 of the mobile computing device 700 below.

The example channeling apparatus 500 includes a number of angled mirrors 502 attached to a nonreflective bottom surface 504. A number of concentrated light beams 208 are shown streaming through slots 506, 508 and reflected light beams 510, 512 being reflected towards the bottom reflective side of a top surface 514. The channeling apparatus 500 includes a light guide 516 into which the reflected beams 510, 512 are output. The top surface 514 also includes a slot 518.

In the example channeling apparatus 500, the number of angled mirrors 502 may receive concentrated light beams 208 and reflect the light beams 510, 512 towards mirrored surfaces 514. In some examples, the angled mirrors can be angled such that the reflected beams of light 510, 512 do not exit out of the slot 518. Thus, angled mirrors 502 can be used to efficiently channel light towards a display without losing concentrated light through slots in the top surface 514. In some examples, the angled mirrors 502 can be mirrored strips 502 set at 45-degrees to the vertical Z-plane and matched to exactly reflect the light coming in through the slots either in the middle of a mirror 202 as discussed in FIG. 2 above, or between mirrors 202 as discussed in FIG. 4. The channeling apparatus 500 can send a directed parallel beam of light along the light guide, rather than a multidirectional beam as in the other solutions.

In some examples, the ratio of length to depth of this type of light guide can be approximately that of the concentration ratio of incoming light sent through the slots in or between the mirrors. In some examples, each reflecting mirror 502 can be staggered on the Z axis to send the light at a different Z-height along the length of the channeling layer.

In some examples, a uniform underside reflective capture area can be used as shown in FIG. 5. The smaller the aperture 506, 508 in the parabolic primary mirror, the smaller the flat angled mirrors 502 can be. Each angled mirror may reflect the light rays to avoid the next angled mirror 502 to the right by reflecting the rays slightly less than 45 degrees. The reflected light rays 510, 512 can reflect off the top mirror 514, which may also be simple glass if the critical angle is met. In some examples, the light beams can travel to the right until they foul one of the flat mirrors 502. While this simpler design does limit the width of capture, such a design may be less expensive to build.

The diagram of FIG. 5 is not intended to indicate that the example apparatus 500 is to include all of the components shown in FIG. 5. Rather, the example apparatus 500 can be implemented using fewer or additional components not illustrated in FIG. 5 (e.g., additional mirrors, slots, reflections, light sources, etc.).

Figure 6:
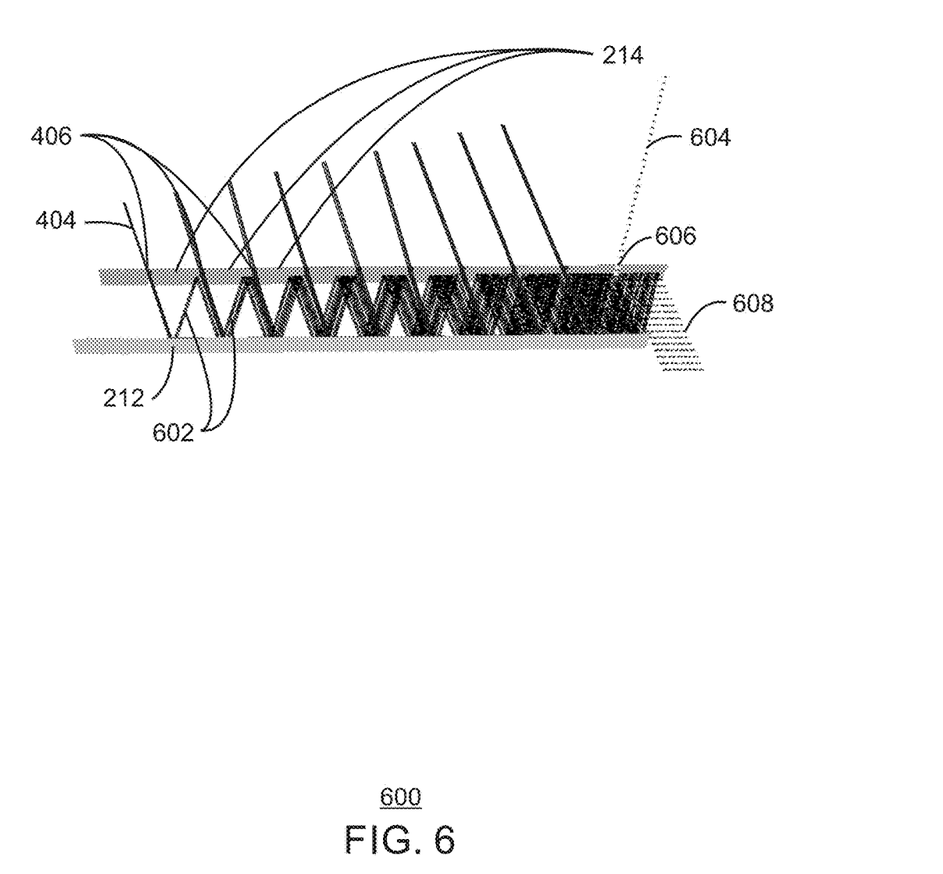
FIG. 6 is a cross section diagram illustrating an example apparatus that can channel collected light via a flat back mirror.

FIG. 6 is a cross section diagram illustrating an example channeling apparatus that can channel collected light via a flat back mirror. The example channeling apparatus is generally referred to by the reference number 600 and can be implemented in the reflex backlight 728 of the mobile computing device 700 below.

The example channeling apparatus 600 includes concentrated light beams directed at an angle towards a first surface 214 having a number of slots 406. A number of reflections 602 of the concentrated light beams 404 are shown between the first surface 214 and the second surface 212. One reflected light beam 604 is shown escaping via a slot 606 of the first surface 214. A number of additional reflected light beams 608 are shown exiting right.

In the example channeling apparatus 600, a simple flat back mirror is used to reflect incoming concentrated light beams 404. In this case, the light reflected through a given slot 406 may reflect just short of the next slot 406. With each return to the upper reflective level 214, the beam 602 may lose a distance equal to the width of the slot 406. For example, if the beam 602 is 1/10 of the width of the slot 406, then the beam 602 may fall back 10 times until the beam 602 reflects out of a slot 606 10 slots 406 to the right. The number of slots the beam 602 can jump can be equal to the ratio between the width of each first parabolic mirror 214 and the width of each slot 406. In the illustration of FIG. 6, the light beam 604 is captured over 8 top mirrors 214 before exiting the 9$^{th}$ slot 606. In some examples, the output beam 608 to the bottom right is a parallel light beam.

The diagram of FIG. 6 is not intended to indicate that the example apparatus 600 is to include all of the components shown in FIG. 6. Rather, the example apparatus 600 can be implemented using fewer or additional components not illustrated in FIG. 6 (e.g., additional mirrors, reflections, light sources, etc.).

Referring now to FIG. 7, a block diagram is shown illustrating an example mobile device that can use ambient light for backlighting. The mobile device 700 may be, for example, an electronic device such as a laptop computer, desktop computer, tablet computer, mobile device, or camera, among others. In some examples, the mobile device 700 may be a smart camera or a digital security surveillance camera. The mobile device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the mobile device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random access memory (DRAM).

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for backlighting a display using ambient light. The device drivers 710 may be software, an application program, application code, or the like.

The mobile device 700 may also include a graphics processing unit (GPU) 708. As shown, the CPU 702 may be coupled through the bus 706 to the GPU 708. The GPU 708 may be configured to perform any number of graphics operations within the mobile device 700. For example, the GPU 708 may be configured to render or manipulate graphics images, graphics frames, videos, or the like, to be displayed to a user of the mobile device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute instructions for collecting ambient light via MEMS mirrors. The device drivers 710 may be software, an application program, application code, or the like.

The CPU 702 may also be connected through the bus 706 to an input/output (I/O) device interface 712 configured to connect the mobile device 700 to one or more I/O devices 714. The I/O devices 714 may include, for example, a keyboard and a pointing device, wherein the pointing device may include a touchpad or a touchscreen, among others. The I/O devices 714 may be built-in components of the mobile device 700, or may be devices that are externally connected to the mobile device 700. In some examples, the memory 704 may be communicatively coupled to I/O devices 714 through direct memory access (DMA).

The CPU 702 may also be linked through the bus 706 to a display interface 716 configured to connect the mobile device 700 to a display device 718. The display device 718 may include a display screen that is a built-in component of the mobile device 700. The display device 718 may also include a computer monitor, television, or projector, among others, that is internal to or externally connected to the mobile device 700.

The mobile device 700 also includes a storage device 720. The storage device 720 is a physical memory such as a hard drive, an optical drive, a thumbdrive, an array of drives, a solid-state drive, or any combinations thereof. The storage device 720 may also include remote storage drives. The storage device 720 may include a detector 722. The detector 722 can detect a reflex angle based on data from a gyroscope or accelerometer.

The mobile device 700 may also include a network interface controller (NIC) 724. The NIC 724 may be configured to connect the mobile device 700 through the bus 706 to a network 726. The network 726 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The mobile device 700 may also include a reflex backlight 728 as discussed above. The reflex backlight 728 may include a receiver 730 disposed in a surface of the mobile device 700. In some examples, the receiver 730 may be disposed in a front bezel of the mobile device 700. For example, the receiver 730 may have a width of approximately 2.1 cm. In some examples, the width of the receiver 730 may match the top of a bezel of the mobile device. The reflex backlight may also include a concentrator 732 including a number of mirrors. In some examples, a number of top film mirrors may be 20 mirrors with a width of about 1 mm each, and a mirror gap of approximately 0.05 mm. In some examples, an incident light angle of about 15 degrees between the mobile device 700 and a direction of sunlight may be used to enable the reflex backlight 728. In some examples, the mirrors may be MEMS mirrors that can adjust to produce an incident light angle of about 15 degrees between the mirrors and the direction of the light. In some examples, a glass thickness of the reflex backlight may be about 0.5 mm. For example, the glass thickness may be about the same thickness of a bezel glass of the mobile device 700. An angle to vertical of beam in reflective space may be approximately 26.5 degrees. In some examples, the travel per reflection may thus be 1 mm and the thickness of a reflective area may be 1 mm.

In some examples, a capture area of about 1 mm thickness may deliver light from a 1.2 cm width with about 90% efficiency, as a 1 mm wide beam of parallel light for direction into the diffusion layer of a backlight for the display. In some examples, options can exist to extend the usable width. For example, there may be a clear line on the back reflector where the beam will reflect right before exiting a slot, such as slot 606 in FIG. 6 above. By placing a gently angled mirror at the reflection point right before the slot exit, the light beams can be made to reflect off one side of the slot they would otherwise have exited from. The angled mirror may change the angle of the reflective waves from this point on, however they would extend the travel to create a wider area of capture. In some examples, more than one such "slot-hopper" mirrors may be used on the otherwise flat backside mirror.

In some examples, the reflex backlight 728 may include a channeler 734 to channel beams of light received through the receiver to one side of the mobile device. In some examples, light coming out of the right side of the light guide may be handled in a number of ways. For example, given the principal of reversibility of light, a display may also lose light into the reflex backlight 728. In some examples, a mechanism can thus be included to prevent loss of light into the reflex backlight 728. For example, the daylight input can be shuttered until the daylight input is clearing stronger than the electrical backlight. In some examples, in response to the daylight input being detected as being stronger than the electrical backlight, the reflex backlight can be allowed to light the display and the electrical backlight can be managed to a predetermined power level. For example, the electrical backlight can be powered off completely. In some examples, the light may be focused through a small aperture into a diffuser. For example, the light can be diffused on the far side of the aperture and the aperture can receive little diffuse light coming from the electrical backlight in the other direction. In some examples, Microelectromechanical Systems (MEMS) mirrors can be deployed to select between the daylight and the electrical backlight positions. For example, the MEMS mirrors may select a daylight or electrical backlight position based on a detected amount of ambient light, and an angle that the mobile device is being held, among other possible factors.

The block diagram of FIG. 7 is not intended to indicate that the mobile device 700 is to include all of the components shown in FIG. 7. Rather, the mobile device 700 can include fewer or additional components not illustrated in FIG. 7, such as additional buffers, additional processors, and the like. The mobile device 700 may include any number of additional components not shown in FIG. 7, depending on the details of the specific implementation. Furthermore, any of the functionalities of the CPU 702 may be partially, or entirely, implemented in hardware and/or in a processor. For example, the functionality of the detector 722 may be implemented with an application specific integrated circuit, in logic implemented in a processor, in logic implemented in a specialized graphics processing unit, or in any other device.

Figure 8:
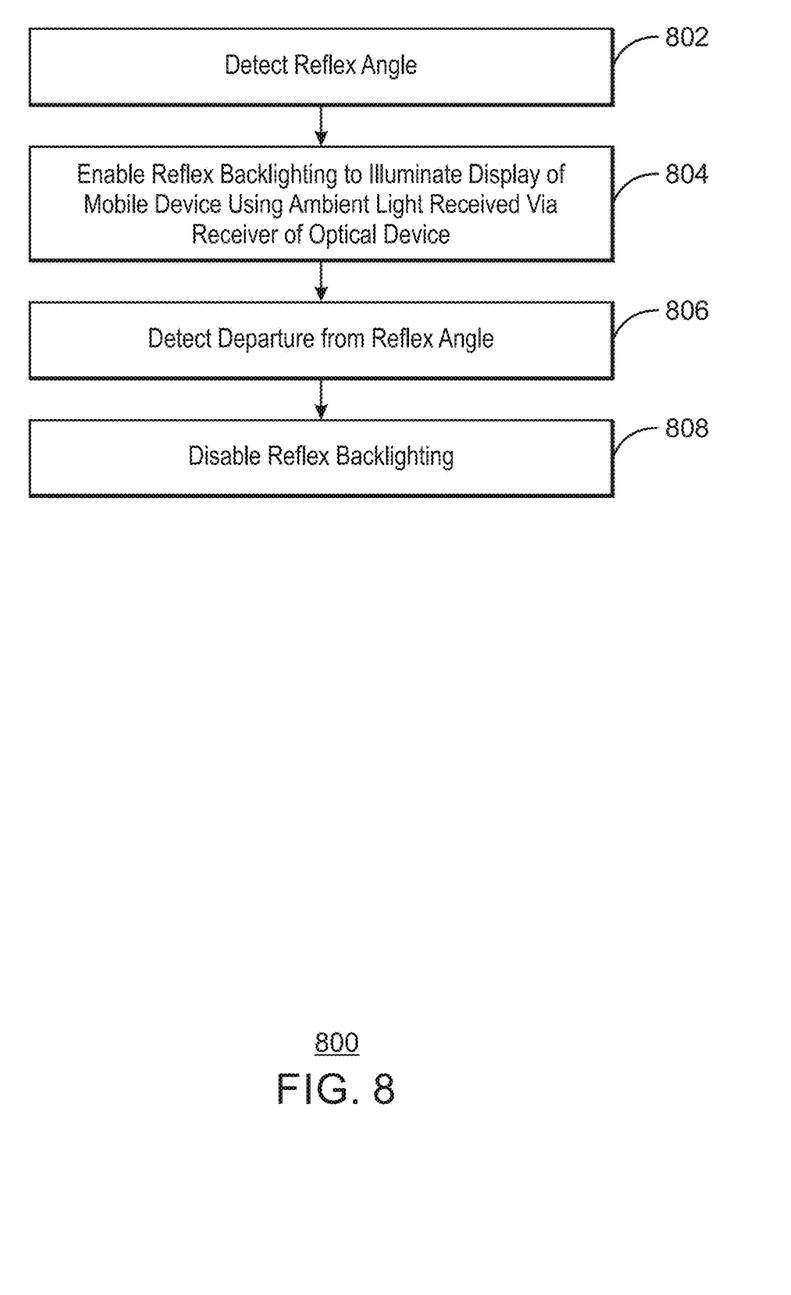
FIG. 8 is a flow chart illustrating a method for backlighting a display using ambient light based on a detected reflex angle.

FIG. 8 is a flow chart illustrating a method for backlighting a display using ambient light based on a detected reflex angle. The example method is generally referred to by the reference number 800 and can be implemented using the mobile device 700 of FIG. 7. For example, the method can be performed by the reflex backlight 726 of FIG. 7 above.

At block 802, the reflex backlight detects a reflex angle at an optical device. For example, the reflex angle may be any angle within a predetermined threshold range of angles between a surface of the mobile device and a direction of the ambient light. In some examples, the reflex angle may be adjustable or user programmable. In some examples, the reflex angle may be based on a source of light. For example, the reflex angle may be calculated with respect to the angle of incoming light from the light source. In some examples, the source of light may be the Sun. In some examples, the reflex angle can be based on an optical focus and include a range of suitable angles. For example, given a softer focus optical mechanism, the reflex angle may be a broader range of angles. In some examples, an optical mechanism with sharper focus may collect more light but result in a narrower range of angles for the reflex angle.

At block 804, the reflex backlight enables reflex backlighting to illuminate a display of the mobile device using ambient light received via a receiver of the optical device. In some examples, the reflex backlight can enable reflex backlighting in response to detecting the departure from the reflex angle. In some examples, the reflex backlight may cause electronic backlighting to be reduced. For example, the electronic backlighting can be reduced in response to enabling the reflex backlighting to save battery resources. In some examples, the reflex backlight can enable reflex backlighting based on a comparison of ambient light with an electronic backlight. For example, the reflex backlighting may be enabled if the ambient light exceeds a threshold percentage of the electronic backlight intensity.

At block 806, the reflex backlight detects a departure from a reflex angle. For example, the reflex backlight may detect an angle outside of a threshold range of angles in which the reflex backlighting may operate.

At block 808, the reflex backlight disables reflex backlighting. For example, the reflex backlight can disable reflex backlighting in response to detecting the departure from the reflex angle. In some examples, the reflex backlight can disable reflex backlighting in response to detecting that an ambient light is less than a threshold percentage of an electronic backlight intensity.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation.

Figure 9:
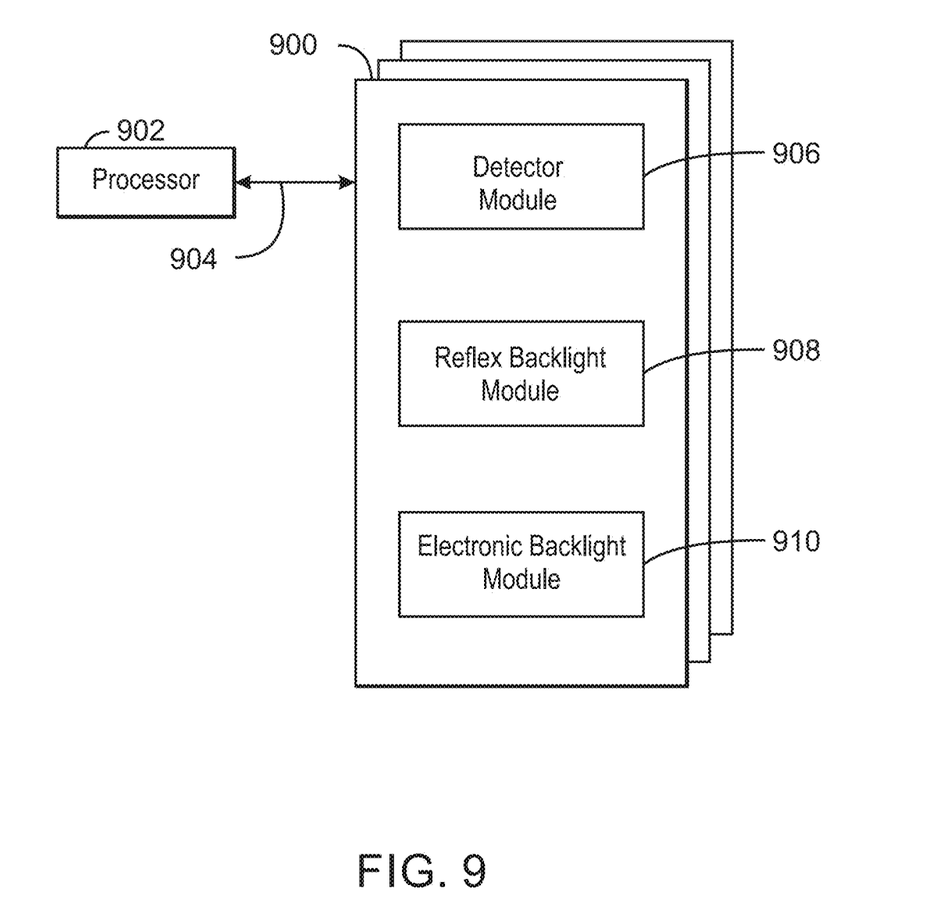
FIG. 9 is a block diagram showing computer readable media that store code for backlighting a display using ambient light.

FIG. 9 is a block diagram showing computer readable media 900 that store code for backlighting a display using ambient light. The computer readable media 900 may be accessed by a processor 902 over a computer bus 904. Furthermore, the computer readable medium 900 may include code configured to direct the processor 902 to perform the methods described herein. In some embodiments, the computer readable media 900 may be non-transitory computer readable media. In some examples, the computer readable media 900 may be storage media. However, in any case, the computer readable media do not include transitory media such as carrier waves, signals, and the like.

The various software components discussed herein may be stored on one or more computer readable media 900, as indicated in FIG. 9. For example, a detector module 906 may be configured to detect a reflex angle at an optical device. For example, the detector module 906 may be configured to detect an angle between a light source and a surface of a mobile device. In some examples, the detector module 906 can detect an intensity of ambient light as compared to a threshold electronic backlight intensity. The reflex backlight module 908 can enable a reflex backlight to illuminate a display of the mobile device using ambient light received via a receiver of the optical device in response to detecting the reflex angle. In some examples, the reflex backlight module 908 can enable the reflex backlight based on a detected intensity of ambient light as compared to a threshold electronic backlight intensity. In some examples, the detector module 908 can switch between the ambient light and an electrical backlight based on the light intensity of the ambient light. In some examples, the detector module 908 may include instructions to adjust microelectromechanical system (MEMS) mirrors to create a reflex angle between the MEMS mirrors and the ambient light. For example, the MEMS mirrors may be adjusted to increase collected ambient light regardless of the position of the mobile device.

In some examples, the detector module 906 can detect a departure from the reflex angle. The reflex backlight module 908 can disable a reflex backlight in response to detecting the departure from the reflex angle. In some examples, the backlight module 908 may switch between an electronic backlight and a reflex backlight based on a detected ambient light intensity. In some examples, the electronic backlight module 910 can reduce electronic backlighting in response to enabling the reflex backlighting. For example, the electronic backlight module 910 can reduce an intensity of an electronic backlight based on a detected ambient light intensity. For example, based on an ambient light exceeding a specified threshold intensity, the electronic backlight may be reduced by a predetermined amount. In some examples, the electronic backlight module 910 can disable electronic backlighting in response to enabling the reflex backlighting. In some examples, the reflex backlight module 908 can disable a light block in response to enabling the reflex backlight and enable the light block in response to disabling the reflex backlight. For example, the light block may be used to allow light through the reflex backlight when the reflex backlight is enabled, and block light from escaping the display through the reflex backlight when the reflex back light is disabled.

The block diagram of FIG. 9 is not intended to indicate that the computer readable media 900 is to include all of the components shown in FIG. 9. Further, the computer readable media 900 may include any number of additional components not shown in FIG. 9, depending on the details of the specific implementation.

EXAMPLES

Example 1 is an optical device for backlighting. The device includes a receiver disposed in a mobile device to receive ambient light. The device also includes a concentrator to concentrate the received ambient light received through the receiver. The device further includes a channeler to direct the ambient light beneath a surface of the mobile device to a digital display of the mobile device.

Example 2 includes the device of example 1, including or excluding optional features. In this example, the receiver comprises a portion of the surface of the mobile device.

Example 3 includes the device of any one of examples 1 to 2, including or excluding optional features. In this example, the concentrator comprises a first parabolic mirror to reflect the ambient light to a second parabolic mirror, wherein the second parabolic mirror is to reflect the light back through a slot in the first parabolic mirror.

Example 4 includes the device of any one of examples 1 to 3, including or excluding optional features. In this example, the concentrator comprises a first parabolic mirror to reflect the ambient light to a second parabolic mirror, wherein the second parabolic mirror is angled to reflect light back through a space between the first parabolic mirror and a neighboring third parabolic mirror.

Example 5 includes the device of any one of examples 1 to 4, including or excluding optional features. In this example, the channeler comprises a diffraction film beneath the display.

Example 6 includes the device of any one of examples 1 to 5, including or excluding optional features. In this example, the channeler comprises a tilted mirror between two reflective surfaces under the display.

Example 7 includes the device of any one of examples 1 to 6, including or excluding optional features. In this example, the channeler comprises a stepped mirror between two reflective surfaces under the display.

Example 8 includes the device of any one of examples 1 to 7, including or excluding optional features. In this example, the device includes a plurality of microelectromechanical system (MEMS) mirrors to switch between the ambient light and an electrical backlight.

Example 9 includes the device of any one of examples 1 to 8, including or excluding optional features. In this example, the device includes a plurality of microelectromechanical system (MEMS) mirrors at the receiver to adjust angles to create a reflex angle between the MEMS mirrors and the ambient light.

Example 10 includes the device of any one of examples 1 to 9, including or excluding optional features. In this example, the device includes a diffuser to allow light to enter a display and prevent light from escaping the display.

Example 11 is a method for backlighting digital displays. The method includes detecting a reflex angle at an optical device. The method also includes enabling reflex backlighting to illuminate a display of a mobile device using ambient light received via a receiver of the optical device based on the detected reflex angle.

Example 12 includes the method of example 11, including or excluding optional features. In this example, the method includes detecting a departure from the reflex angle. The method further includes disabling the reflex backlighting based on the detected departure.

Example 13 includes the method of any one of examples 11 to 12, including or excluding optional features. In this example, the reflex backlighting is further enabled or disabled based on a comparison of ambient light with an electronic backlight.

Example 14 includes the method of any one of examples 11 to 13, including or excluding optional features. In this example, the reflex angle comprises an angle within a predetermined threshold range of angles between a surface of the mobile device and a direction of the ambient light.

Example 15 includes the method of any one of examples 11 to 14, including or excluding optional features. In this example, the reflex angle is based on a source of light.

Example 16 includes the method of any one of examples 11 to 15, including or excluding optional features. In this example, the reflex angle is adjustable or user programmable.

Example 17 includes the method of any one of examples 11 to 16, including or excluding optional features. In this example, the method includes reducing electronic backlighting in response to enabling the reflex backlighting.

Example 18 includes the method of any one of examples 11 to 17, including or excluding optional features. In this example, the method includes disabling electronic backlighting in response to enabling the reflex backlighting.

Example 19 includes the method of any one of examples 11 to 18, including or excluding optional features. In this example, enabling the reflex backlighting is based on a comparison of the ambient light with an electronic backlight.

Example 20 includes the method of any one of examples 11 to 19, including or excluding optional features. In this example, enabling the reflex backlighting is based on a detection that the ambient light exceeds a threshold percentage of an electronic backlight intensity.

Example 21 is at least one computer readable medium for backlighting a display using ambient light having instructions stored therein that direct the processor to detect a reflex angle at an optical device. The computer-readable medium also includes instructions that direct the processor to enable a reflex backlight to illuminate a display of a mobile device using ambient light received via a receiver of the optical device in response to detecting the reflex angle.

Example 22 includes the computer-readable medium of example 21, including or excluding optional features. In this example, the computer-readable medium includes instructions to detect a departure from the reflex angle and disable a reflex backlight in response to detecting the departure from the reflex angle.

Example 23 includes the computer-readable medium of any one of examples 21 to 22, including or excluding optional features. In this example, the computer-readable medium includes instructions to enable a reflex backlight based on a detected intensity of ambient light as compared to a threshold electronic backlight intensity.

Example 24 includes the computer-readable medium of any one of examples 21 to 23, including or excluding optional features. In this example, the computer-readable medium includes instructions to switch between an electronic backlight and a reflex backlight based on a detected ambient light intensity.

Example 25 includes the computer-readable medium of any one of examples 21 to 24, including or excluding optional features. In this example, the computer-readable medium includes instructions to reduce an intensity of an electronic backlight based on a detected ambient light intensity.

Example 26 includes the computer-readable medium of any one of examples 21 to 25, including or excluding optional features. In this example, the computer-readable medium includes instructions to reduce electronic backlighting in response to enabling the reflex backlighting.

Example 27 includes the computer-readable medium of any one of examples 21 to 26, including or excluding optional features. In this example, the computer-readable medium includes instructions to disable electronic backlighting in response to enabling the reflex backlighting.

Example 28 includes the computer-readable medium of any one of examples 21 to 27, including or excluding optional features. In this example, the computer-readable medium includes instructions to disable a light block in response to enabling the reflex backlight and enable the light block in response to disabling the reflex backlight.

Example 29 includes the computer-readable medium of any one of examples 21 to 28, including or excluding optional features. In this example, the computer-readable medium includes instructions to switch between the ambient light and an electrical backlight.

Example 30 includes the computer-readable medium of any one of examples 21 to 29, including or excluding optional features. In this example, the computer-readable medium includes instructions to adjust microelectromechanical system (MEMS) mirrors to create a reflex angle between the MEMS mirrors and the ambient light.

Example 31 is a system for backlighting. The system includes a receiver disposed in a mobile device to receive ambient light. The system also includes a concentrator to concentrate the received ambient light received through the receiver. The system further includes a channeler to direct the ambient light beneath a surface of the mobile device to a digital display of the mobile device.

Example 32 includes the system of example 31, including or excluding optional features. In this example, the receiver comprises a portion of the surface of the mobile device.

Example 33 includes the system of any one of examples 31 to 32, including or excluding optional features. In this example, the concentrator comprises a first parabolic mirror to reflect the ambient light to a second parabolic mirror, wherein the second parabolic mirror is to reflect the light back through a slot in the first parabolic mirror.

Example 34 includes the system of any one of examples 31 to 33, including or excluding optional features. In this example, the concentrator comprises a first parabolic mirror to reflect the ambient light to a second parabolic mirror, wherein the second parabolic mirror is angled to reflect light back through a space between the first parabolic mirror and a neighboring third parabolic mirror.

Example 35 includes the system of any one of examples 31 to 34, including or excluding optional features. In this example, the channeler comprises a diffraction film beneath the display.

Example 36 includes the system of any one of examples 31 to 35, including or excluding optional features. In this example, the channeler comprises a tilted mirror between two reflective surfaces under the display.

Example 37 includes the system of any one of examples 31 to 36, including or excluding optional features. In this example, the channeler comprises a stepped mirror between two reflective surfaces under the display.

Example 38 includes the system of any one of examples 31 to 37, including or excluding optional features. In this example, the system includes a plurality of microelectromechanical system (MEMS) mirrors to switch between the ambient light and an electrical backlight.

Example 39 includes the system of any one of examples 31 to 38, including or excluding optional features. In this example, the system includes a plurality of microelectromechanical system (MEMS) mirrors at the receiver to adjust angles to create a reflex angle between the MEMS mirrors and the ambient light.

Example 40 includes the system of any one of examples 31 to 39, including or excluding optional features. In this example, the system includes a diffuser to allow light to enter a display and prevent light from escaping the display.

Example 41 is a system for backlighting. The system includes means for receiving ambient light. The system also includes means for concentrating the received ambient light. The system further includes means for directing the ambient light beneath a surface of a mobile device to a digital display of the mobile device.

Example 42 includes the system of example 41, including or excluding optional features. In this example, the means for receiving ambient light comprises a portion of the surface of the mobile device.

Example 43 includes the system of any one of examples 41 to 42, including or excluding optional features. In this example, the means for concentrating the received ambient light comprises a first parabolic mirror to reflect the ambient light to a second parabolic mirror, wherein the second parabolic mirror is to reflect the light back through a slot in the first parabolic mirror.

Example 44 includes the system of any one of examples 41 to 43, including or excluding optional features. In this example, the means for concentrating the received ambient light comprises a first parabolic mirror to reflect the ambient light to a second parabolic mirror, wherein the second parabolic mirror is angled to reflect light back through a space between the first parabolic mirror and a neighboring third parabolic mirror.

Example 45 includes the system of any one of examples 41 to 44, including or excluding optional features. In this example, the means for directing comprises a diffraction film beneath the display.

Example 46 includes the system of any one of examples 41 to 45, including or excluding optional features. In this example, the means for directing comprises a tilted mirror between two reflective surfaces under the display.

Example 47 includes the system of any one of examples 41 to 46, including or excluding optional features. In this example, the means for directing comprises a stepped mirror between two reflective surfaces under the display.

Example 48 includes the system of any one of examples 41 to 47, including or excluding optional features. In this example, the system includes means for switching between the ambient light and an electrical backlight.

Example 49 includes the system of any one of examples 41 to 48, including or excluding optional features. In this example, the system includes a means for adjusting angles to create a reflex angle between MEMS mirrors and the ambient light.

Example 50 includes the system of any one of examples 41 to 49, including or excluding optional features. In this example, the system includes means for allowing light to enter a display and preventing light from escaping the display.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An optical device for backlighting, comprising:
   a receiver disposed in a mobile device to receive ambient light;
   a concentrator to concentrate the received ambient light received through the receiver, wherein the concentrator comprises a first parabolic mirror to reflect the ambient light to a second parabolic mirror, wherein the second parabolic mirror is to reflect the light back through a slot in the first parabolic mirror; and
   a channeler to direct the ambient light beneath a surface of the mobile device to a digital display of the mobile device.

2. The optical device of claim 1, wherein the receiver comprises a portion of the surface of the mobile device.

3. The optical device of claim 1, wherein the channeler comprises a diffraction film beneath the display.

4. The optical device of claim 1, wherein the channeler comprises a tilted mirror between two reflective surfaces under the display.

5. The optical device of claim 1, wherein the channeler comprises a stepped mirror between two reflective surfaces under the display.

6. The optical device of claim 1, further comprising a plurality of microelectromechanical system (MEMS) mirrors to switch between the ambient light and an electrical backlight.

7. The optical device of claim 1, further comprising a plurality of microelectromechanical system (MEMS) mirrors at the receiver to adjust angles to create a reflex angle between the MEMS mirrors and the ambient light.

8. The optical device of claim 1, further comprising a diffuser to allow light to enter a display and prevent light from escaping the display.

9. A method for backlighting digital displays, comprising:
   detecting a reflex angle at an optical device;
   enabling reflex backlighting to illuminate a display of a mobile device using ambient light received via a receiver of the optical device based on the detected reflex angle; and
   concentrating, via a concentrator, the ambient light received via the receiver, wherein the concentrator comprises a first parabolic mirror to reflect the ambient light to a second parabolic mirror, wherein the second parabolic mirror is angled to reflect light back through a space between the first parabolic mirror and a neighboring third parabolic mirror.

10. The method of claim 9, further comprising:
detecting a departure from the reflex angle; and
disabling the reflex backlighting based on the detected departure.

11. The method of claim 9, wherein the reflex backlighting is further enabled or disabled based on a comparison of ambient light with an electronic backlight.

12. The method of claim 9, wherein the reflex angle comprises an angle within a predetermined threshold range of angles with respect to a vertical axis.

13. The method of claim 9, wherein the reflex angle is based on a source of light.

14. At least one computer readable medium for backlighting a display using ambient light having instructions stored therein that, in response to being executed on a computing device, cause the computing device to:
detect a reflex angle at an optical device;
enable a reflex backlight to illuminate a display of a mobile device using ambient light received via a receiver of the optical device in response to detecting the reflex angle; and
concentrate, via a concentrator, the ambient light received via the receiver, wherein the concentrator comprises a first parabolic mirror to reflect the ambient light to a second parabolic mirror, and wherein the second parabolic mirror is to reflect the light back through a slot in the first parabolic mirror.

15. The at least one computer readable medium of claim 14, comprising instructions to:
detect a departure from the reflex angle; and
disable a reflex backlight in response to detecting the departure from the reflex angle.

16. The at least one computer readable medium of claim 14, comprising instructions to enable a reflex backlight based on a detected intensity of ambient light as compared to a threshold electronic backlight intensity.

17. The at least one computer readable medium of claim 14, comprising instructions to switch between an electronic backlight and a reflex backlight based on a detected ambient light intensity.

18. The at least one computer readable medium of claim 14, comprising instructions to reduce an intensity of an electronic backlight based on a detected ambient light intensity.

* * * * *